United States Patent [19]
Jiang et al.

[11] Patent Number: 5,636,298
[45] Date of Patent: Jun. 3, 1997

[54] COALESCING OPTICAL MODULE AND METHOD FOR MAKING

[75] Inventors: Wenbin Jiang, Phoenix; Michael S. Lebby, Apache Junction, both of Ariz.

[73] Assignee: Motorola, Schaumburg, Ill.

[21] Appl. No.: 699,318

[22] Filed: Aug. 19, 1996

[51] Int. Cl.$^6$ .................................................. G02B 6/26
[52] U.S. Cl. ...................... 385/14; 385/45; 385/131
[58] Field of Search ............................. 385/88–94, 45, 385/11, 131, 132

[56] References Cited

U.S. PATENT DOCUMENTS

| | | |
|---|---|---|
| 5,228,101 | 7/1993 | Lebby et al. ............................ 385/91 |
| 5,249,245 | 9/1993 | Lebby et al. ............................ 385/89 |
| 5,345,524 | 9/1994 | Lebby et al. ............................ 385/88 |
| 5,522,002 | 5/1996 | Chun et al. ............................. 385/88 |
| 5,539,848 | 7/1996 | Galloway ............................... 385/89 |
| 5,574,814 | 11/1996 | Noddings et al. ...................... 385/90 |

*Primary Examiner*—John Ngo
*Attorney, Agent, or Firm*—Gary F. Witting; Eugene A. Parsons

[57] ABSTRACT

An optical module (100) having a first side (103) and a second side (104), a plurality of input optical ports (144) and an output optical port (120) is formed. The input optical ports (144) are disposed on the first side (103) with the output optical port (156) being disposed on the second side (104) of the optical module (100). A plurality of bifurcated waveguides (118) are disposed in the optical module, the bifurcated waveguides (118) coalesce light from the plurality of input optical ports (144) into a single high power output at the output optical port (120).

15 Claims, 2 Drawing Sheets

COALESCING OPTICAL MODULE AND METHOD FOR MAKING

FIELD OF THE INVENTION

This invention relates, in general, to optical devices and, in particular to interconnection of optical devices and waveguides.

BACKGROUND OF THE INVENTION

At present, edge emitting lasers are used for high power applications. However, edge emitting lasers have several problems, such as difficulty in manufacture, manual alignment, high cost, and the like.

Recently, there has been interest in an optical device called a vertical cavity surface emitting laser (VCSEL). VCSELs offer several potential advantages, such as emitting light perpendicular to its die, providing a feasibility of an array of VCSELs, integration with standard electronic components, as well as on wafer testing. However, at present, conventional VCSEL devices are low power devices. Since conventional VCSELs are low power devices, their use in higher power applications, such as optical phase changing applications, and the like are limited. Further, it should be noted that because conventional VCSELs are low power devices, the other advantages previously mentioned with regard to VCSELs, can not be realized.

It can readily be seen that conventional VCSEL devices can not be used for higher power applications, thus presenting several disadvantages and problems and limiting their use in higher power applications. Therefore, an article and method for making that allows VCSEL devices to be used in higher power applications, with a reduction of cost, and increase manufactureability would be highly desirable.

It is a purpose of the present invention to provide a new and improved coalescing optical module.

It is another purpose of the present invention to provide an unlimited number of light emitting devices coalesced into a common output.

It is still another purpose of the present invention to provide sum the outputs of an unlimited number of light emitting devices for higher power applications.

It is a further purpose of the present invention to provide a new and improved coalescing optical module that is highly manufacturable.

SUMMARY OF THE INVENTION

The above problems and others are at least partially solved and the above purposes and others are realized in

BRIEF DESCRIPTION OF THE DRAWINGS

Referring to the drawings.

DESCRIPTION OF THE PREFERRED EMBODIMENT

Figure 1:
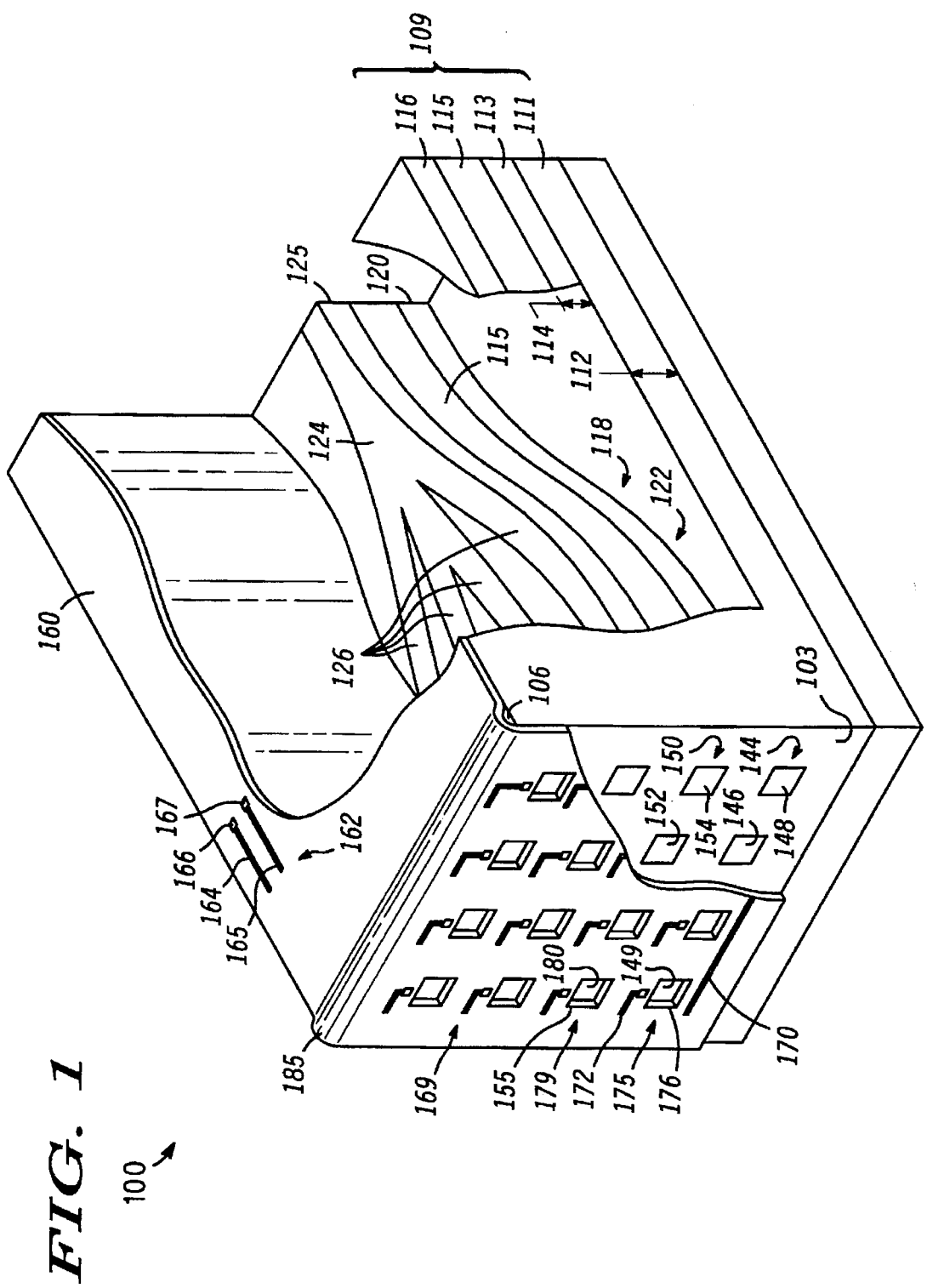
FIG. 1 is a greatly enlarged simplified view of a coalescing optical module in accordance with the present invention, shown in an isometric view, with portions thereof removed.

Referring now to the figures, FIG. 1 is a greatly enlarged illustration of an optical module 100 disposed on a surface 102 of a substrate 101 with a flexible circuit tape 160 being attached to optical module 100. Optical module 100 is constructed to define a first end or side 103, a second end or side 104, and a joining upper surface 106. In this specific embodiment, module 100 is fabricated with a plurality of layers 109, including a layer 111 with a desired thickness 112, a layer 113 with a desired thickness 114, a layer 115, and a layer 116.

A first bifurcated waveguide 118, having an end 120 in side 104 of module 100 and a plurality of bifurcations or arms 122, is illustrated in a broken away portion of FIG. 1. Waveguide 118 is formed in layer 113, as will be explained in more detail below. A second bifurcated waveguide 124, having an end 125 in side 104 of module 100 and a plurality of bifurcations or arms 126, is formed in layer 116. A first row of optical ports 144, including an optical port 146, an optical port 148, and an optical port 149, is provided in end 103 of module 100. Each of the optical ports 144 defines an end or inlet for each bifurcation or arm 122 of waveguide 118 and end 120 defines an outlet port. A second row of optical ports 150, including an optical port 152, an optical port 154, and an optical port 155, defines ends or inlets for bifurcations or arms 126 of waveguide 124 and end 125 defines an outlet therefor.

Flexible circuit tape 160 is made to include a first plurality of electrical tracings 162, including an electrical trace 164, an electrical trace 165, a bonding pad 166, and a bonding pad 167, positioned to overlie joining surface 106 of module 100. Tape 160 also has a second plurality of electrical tracings 169, including an electrical trace 170 and an electrical trace 172, positioned to overlie end 103 of module 100. Further, a plurality of optical ports are defined through tape 160 in the portion overlying end 103 of module 100, including a first row of windows 175, and a second row of windows 179. The rows of windows 175 and 179 defined in tape 160 are positioned to be optically aligned with optical ports 144 and 150, of bifurcated waveguides 118 and 124, respectively.

Substrate 101 can be made of any suitable material, such as silicon, plastic, glass, or the like that provides suitable support for optical module 100. However, in a preferred embodiment of the present invention, substrate 101 is made of silicon. Typically, substrate 101 is a silicon wafer well known in the semiconductor art, thereby providing several manufacturing advantages that will be illustrated and discussed herein.

Optical module 100 is made of any suitable material or any combination of materials, such as polymeric materials, e.g., plastic, epoxy, polyimide, photoresist, silicate, or the like. Additionally, optical module 100 can be made by any suitable processes, or combination of processes, such as molding, deposition, lamination, application, photolithography, curing, spin-on, or the like.

By way of example, with substrate 101 being a silicon wafer and with polyimide as a starting material, layer 111 is formed by having a liquid polyimide solution deposited onto surface 102 and subsequently spun over surface 102, thereby forming layer 111 across surface 102 of the silicon wafer at desired thickness 112. Generally, the plurality of layers 109 are applied to surface 102 of substrate 101 in this manner one layer at a time. However, while the plurality of layers 109 are indicated by dotted lines and shown in FIG. 1, it should be understood that depending upon the material choices used to make the plurality of layers 109 the dotted lines or interfaces that are indicated may or may not be observable or present. It should be further understood that specific processing of the plurality of layers 109 is material specific. Thus, a wide range of processing conditions can be used, as well as having some processing steps with some material selections being omitted.

Generally, layers 111, 113, 115, and 116 can be any suitable thickness that provides a reasonably uniform film or layer across surface 102 of substrate 101. Typically, these thicknesses of each individual layer, i.e., layers 111, 113, 115, and 116 can range from 1.0 micron to 20 millimeters, with a preferred thickness ranging from 1.0 millimeter to 15.0 millimeters, and a nominal range between 8.0 millimeters to 12.0 millimeters. However, if the thickness of a specific layer, e.g., desired thickness 112 of layer 111, is not thick enough to perform the desired functions, then additional material can be added by any suitable method such as deposition, e.g., sputtering, plasma enhanced chemical vapor deposition (PECVD), lamination, additional spin-on processes, or the like, to adjust the layer to the correct thickness. For example, an additional layer of material, such as a dielectric material, e.g., a silicon dioxide, a silicon nitride, a polymer, or the like, a metal material, e.g., gold, platinum, or the like, a semiconductive material, e.g., silicon can be formed on layer 111.

After layer 111 is applied to surface 102 of substrate 101, layer 111 is sometimes cured, depending upon the chosen material. Curing of layer 111, as with all the plurality of layers 109, typically involves subjecting it to heating for a period of time. Typically, the curing temperature ranges from 100 degrees Celsius to 400 degrees Celsius for a period of time ranging from 5.0 minutes to 60 minutes. Generally, the curing process drives the solvent out of the liquid polyimide solution from which layer 111 is formed, thereby firming layer 111, as well as setting or fixing the refractive index of layer 111.

Once layer 111 has been spun-on to surface 102 and cured if necessary, layer 113 is applied to the surface of layer 111. Layer 113 is disposed on layer 111 as layer 111 was disposed on surface 102 of the silicon wafer. However, the polyimide solution that is dispensed onto the silicon wafer to form layer 113 is a photosensitive polyimide solution, thus enabling photolithographic patterning of the photosensitive polyimide solution. In the present example, layer 113 is exposed by a photolithographic process such that portions of layer 113 are exposed to light while other portions of layer 113 are not. In the present example, the portion of layer 113 coinciding with bifurcated waveguide 118 is exposed to light from the photolithographic process, thereby elevating the refractive index of that portion and defining waveguide 118. Thus, making the material of layer 113 which defines waveguide 118 capable of internally reflecting light that is contained inside of waveguide 118. After the photolithographic process is complete, layer 113 is cured as previously described, thereby fixing the refractive indexes of the exposed portions and the unexposed portions of layer 113.

As shown in FIG. 1, waveguide 118 includes four separated bifurcations or arms 122 that coalesce or join in the main body portion and converge toward end 120. Thus, light traveling through each of the four separate arms 122 of waveguide 118 is summed in the main body portion of waveguide 118 to exit as a single source at end 120. It should be understood that the separate arms 122 can be decreased or increased to any desired number that is practical for the desired purposes and the photolithographic process. Layers 115 and 116 are disposed and processed in a manner similar to layers 111 and 113, respectively, and, along with layer 111, serve as spacers between bifurcated waveguides 118 and 124 and surrounding cladding layers. While only four layers 111, 113, 115, and 116 are shown in the FIG. 1, it should be understood that many more layers can be added, thereby increasing a potential number of waveguides stacked on top of each other.

Once a desired number of layers has been applied with a desired number of waveguides defined therein, individual optical modules are separated from each other by a separation process. Any suitable separation process or method well known in the art can be used, such as laser abating, sawing, cleaving, or the like. When the separation process is completed, sides 103 and 104 are processed to expose the row of optical ports 144, the row of optical ports 150, optical port 120, and optical port 125. Thus, optical coupling is provided between the row of optical ports 144 and optical port 120, and between the row of optical ports 150 and optical port 125. Once sides 103 and 104 have been processed to expose the row of optical ports 144, the row of optical ports 150, optical port 120, and optical port 125, optical module 100 is ready for application of flexible circuit tape 160.

A detailed description of flexible tape which can be used as flexible circuit tape 160 is presented in U.S. Pat. No. 5,249,245 entitled "OPTOELECTRONIC MOUNT INCLUDING FLEXIBLE SUBSTRATE AND METHOD FOR MAKING SAME" issued Sep. 28, 1993, assigned to the same assignee and incorporated herein by reference. Generally, flexible circuit tape 160 is made from any thin insulative material, such as those typically suitable for tape automated bonding (TAB). Polyimide is a representative material, but is certainly not the only one; polyimide used for this task can be found under the trade names such as "UPLEX" or "KAPTON" among others. Other suitable materials include, but are not necessarily limited to, polyester, mylar, and composite materials. Composite materials include resin-filed epoxy or fiber reinforced materials, or the like.

As shown in FIG. 1, flexible circuit tape 160 includes the plurality of electrical traces 162, bonding pads 166, 167, and the plurality of electrical traces 169. Generally, the plurality of electrical traces 162 and the plurality of electrical traces 169 are formed by any suitable method such as but not limited to plating, etching, photolithography, printing, or the like. Typically, electrical traces 164, 165, 170, 172, and bonding pads 166, 167 are made of a metal or metal alloy, such as copper (Cu), aluminum (Al), tin (Sn), titanium/ tungsten (TiW), or the like. Adhesion of the plurality of electrical traces 162 and 169 is such that delamination or separation will not occur from the thin insulative material when bent or positioned on optical module 100. Further, materials selected for manufacture of flexible circuit tape 160 are temperature resistant such that an overmolding process can be used to encapsulate optical module 100.

Generally, the plurality of electrical traces 162 the plurality of electrical traces 169 represent an electrical communication system that allows electrical signals to be sent throughout flexible circuit tape 160, as well as allowing electrical signals to be inputted and outputted from flexible circuit tape 160. More particularly, bonding pads 166 and 167 illustrate electrical coupling areas where electrical signals can be inputted and outputted and where electrical devices can be mounted. The electrical coupling is achieved by any suitable method or technique, such as wire bonding, bump bonding, or the like. For example, bonding pads 166 and 167 can be used as wire bond pads, thereby electrically coupling flexible circuit tape 160 to other standard electronic devices that are not shown in FIG. 1. Alternatively, bonding pads 166 and 167 can be use to electrically couple other electronic devices such as integrated circuits, resistors, capacitors, and the like to flexible circuit tape 160. Electrical traces 164 and 165 illustrate and represent electronic communication pathways that can communicate throughout flexible circuit tape 160.

Electrical trace 170 illustrates a grounding bus that provides a common potential for a number of photonic devices, e.g., a VCSEL array (shown in FIG. 2) that may extend across the plurality of optical ports 175, whereas electrical trace 172 illustrates a single electronic contact for a single photonic device in the VCSEL array. As shown in FIG. 1, the row of windows 175 and the row of windows 179 are formed in flexible circuit tape 160 by any suitable method, such as defining an opening, generating a transparent area, or the like. By way of example, a window 176 of the plurality of windows 175 is made by providing an opening through which light can pass into optical port 149 of optical module 100. In yet another example, window 180 of the plurality of windows 179 is made by clearing a portion of flexible circuit tape 160 so that light can pass through the cleared portion of window 180 to optical port 155 of optical module 100.

Accurate placement or alignment of flexible circuit tape 160 to optical module 100 is achieved by any suitable method well known in the art. Generally, alignment is achieved by use of a robotically controlled system; however, it should be noted that the robotically controlled systems can also use machine vision, thereby increasing accuracy of alignment. It should be further noted that accuracy can be further augmented by using alignment fiducials and other alignment aids, such as tabs, or the like.

Affixing of flexible circuit tape 160 to optical module 100 is achieved by any suitable adhesive, such as polyimide, epoxy, or any ultraviolet curable adhesive. Typically, flexible circuit tape 160 is affixed to optical module 100 by a robotic control system, thereby ensuring accurate placement and affixing of flexible circuit tape 160 to optical module 100. By way of example, with an optical epoxy adhesive being applied to side 103 and surface 106 of optical module 100, flexible circuit tape 160 is positioned and applied to side 103 and surface 106, thereby adhering flexible circuit tape 160 to optical module 100. Generally, when flexible circuit tape 160 is applied to optical module 100, a loop 185 is formed which allows flexible circuit tape 160 to traverse from side 103 to surface 106 in a gradual manner, thereby providing stress relief.

Figure 2:
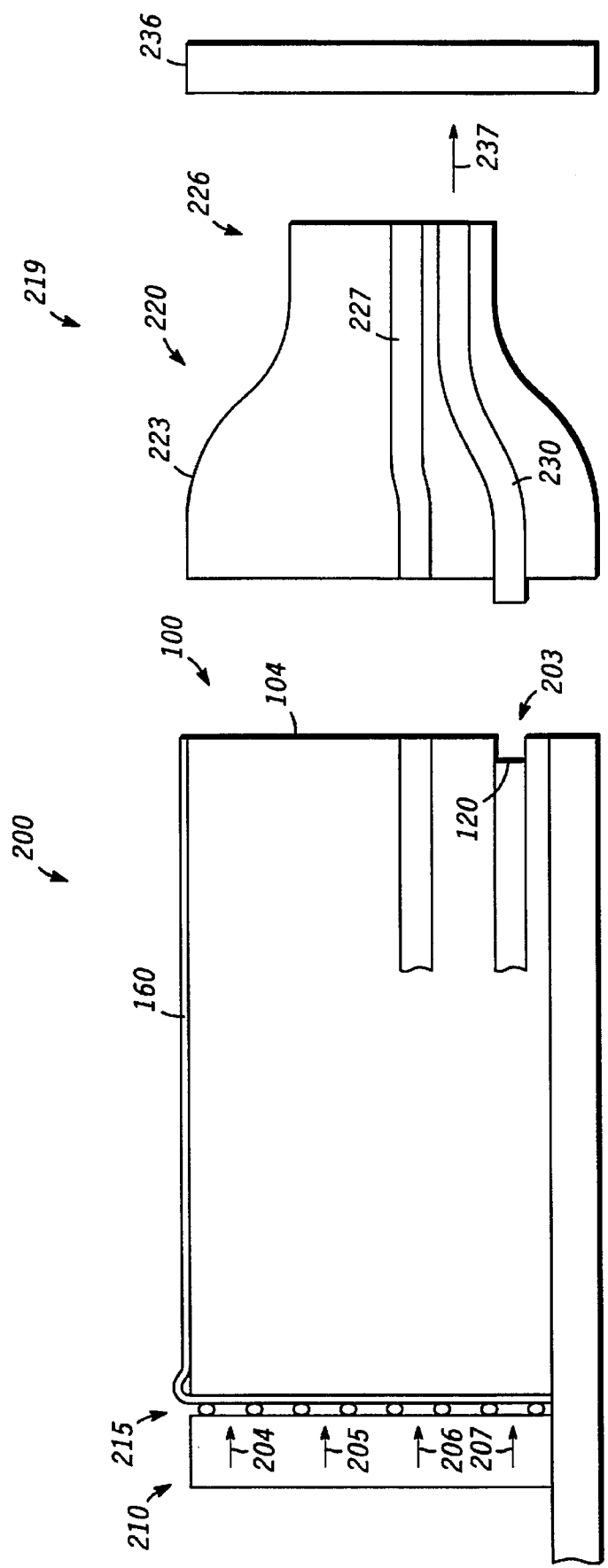
FIG. 2 is a greatly enlarged, simplified, sectional view of an optical connector including the optical module of FIG. 1.

FIG. 2 is a sectional view of a greatly enlarged, simplified, partially exploded sectional view of an optical mount 200. It should be understood that elements illustrated in FIG. 2 which are similar to elements previously described in FIG. 1 will retain their original identification numerals. Optical mount 200 includes optical module 100 with an opening 203 defined in end 104, flexible tape 160, an array of VCSELs 210 and an output device 219, which may or may not be considered a part of mount 200. Array 210 generally includes a plurality of photonic devices, represented by arrows 204, 205, 206, and 207, and a plurality of electrical contacts 215. Output device 219 includes an optical connector 220 having a body 223, an optical fiber ribbon cable 226 having an optical fiber 227, and an optical fiber 230.

Array 210 of photonic devices, which in this specific example are VCSELs, may, instead of or in addition to, include light emitting devices (LEDs), photodetectors or the like. Array 210 is physically coupled to flexible circuit tape 160 by bump bonding or the like and is electrically coupled to flexible circuit tape 160 by the plurality of electrical contacts 215, thereby enabling electrical control of array 210. The plurality of electrical contacts 215 is made by any suitable method well known in the art, such as solder bumps, conductive adhesive bumps, or the like.

Referring now to both FIGS. 1 and 2, in function, with array 210 an array of VCSELs and with arrow 207 representing one of a plurality of VCSELs positioned across, or optically aligned with, the plurality of windows 175, light generated from the plurality of VCSELs enters the plurality of optical ports 144 of waveguide 118 and travels through the plurality of arms 122 of waveguide 118 where the light combines or coalesces adjacent to output port 120 of waveguide 118. By coalescing the light from array 210 of VCSELs, represented by arrow 207, power from each individual VCSEL is summed in waveguide 118. Thus, the power outputted from optical port 120 is the sum of the inputted power of the plurality of VCSELs.

For example, if array 210 of VCSELs has four individual VCSELs aligned with the row of windows 144, then the power in waveguide 118 is the sum of the power from the four individual VCSELs. Thus, the power from the plurality of VCSELs can be summed in optical module 100 and outputted from waveguide 118 through optical port 120. While only the plurality of VCSELs that are associated with plurality of optical ports 144 and waveguide 118 have been discussed herein above, it should be understood that another plurality of VCSELs corresponding to waveguide 122 would function and be described in a similar manner. With the summation of the plurality of VCSELs (shown in FIGS. 1 and 2), optical module 100 allows the use of relatively low power devices in higher power applications.

In one example of use in a higher power application, any suitable output device 219, such as a waveguide, individual optical fibers, or the like, is used in conjunction with module 100. In the present example, optical connector 220 is used to accept the output from optical ports 120 and 125. Generally, optical connector 220 has a body that aligns itself with optical module 100, thereby aligning optical fibers 227 and 230 with optical port 120 and 125, respectively. Two potential connecting techniques are illustrated in FIG. 2. Optical fiber 227 illustrates a butt joint between optical fiber 227 and optical port 125 and optical fiber 230 illustrate an insertion of optical fiber 230 into opening 203 to join optical fiber 230 with optical port 120. Other techniques for communicating light out of or into waveguides 122 and 124 will be apparent to those skilled in the art. In a specific example which might be used for very high power outputs, a second module, similar to module 100, could be turned 90 degrees to optically align a row of optical ports (e.g. 144) with optical ports 120, 125, etc. Thus, the second optical module would coalesce the outputs of several rows of VCSELs into a single output.

Once the light from the plurality of VCSELs has passed through optical module 100 and entered optical fiber 230, optical fiber 230 can be split off from the rest of optical fiber ribbon cable 226, represented by arrow 237, to be positioned over or adjacent a phase changing media 237, thereby enabling data storage on phase changing media 237. Generally, phase changing media 237 react to light by changing phases from an amorphous state to a more crystalline state, thereby changing reflectivity.

By now it should be appreciated that a novel optical module and method for making have been provided. A coalescing optical module that enables an unlimited number of light emitting devices to be coalesced has been provided, thereby allowing relatively low power devices to be summed and used for higher power applications. Further, since the array of photonic devices and the optical module with the flexible tape are made with automated manufacturing techniques, the optical module and associated components are highly manufacturable.

While we have shown and described a specific embodiment of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A coalescing optical module comprising:

an optical module having a first side, with a plurality of input optical ports therein, and a second side with an output optical port therein;

a bifurcated waveguide disposed in the optical module and having a plurality of bifurcations, each bifurcation having a light port at one end of the bifurcated waveguide optically aligned with and defining one input optical port of the plurality of input optical ports, and the bifurcations converging to define a single output optical port at a second end of the bifurcated waveguide optically aligned with and defining the output optical port in the second side of the optical module; and a plurality of vertical cavity surface emitting lasers positioned on the first side of the optical module, one each positioned in optical communication with one of the input optical ports, the bifurcated waveguide coalescing outputs of the plurality of vertical cavity surface emitting lasers into a single high power output.

2. A coalescing optical module as claimed in claim 1 wherein the optical module is made of a polymer material.

3. A coalescing optical module as claimed in claim 2 wherein the polymer material making the first waveguide and the second waveguide is photosensitive.

4. A coalescing optical module as claimed in claim 1 and further including a flexible circuit tape having a plurality of input windows, a plurality of output windows, a first plurality of electrical tracings, and a second plurality of electrical tracings, the input windows and the output windows of the flexible circuit tape being disposed over the plurality of input optical ports, between the plurality of vertical cavity surface emitting lasers and the first side of the optical module, and the plurality of output optical ports of the optical module, respectively, substantially aligning the plurality of input optical ports and the plurality of output optical ports and the input windows and the plurality of output windows and each vertical cavity surface emitting laser of the plurality of vertical cavity surface emitting lasers being electrically connected to the first plurality of electrical tracings.

5. A coalescing optical module comprising:

an optical module having a first side, with a plurality of rows of input optical ports therein, and a plurality of output optical ports;

a plurality of bifurcated waveguides disposed in the optical module and having a plurality of bifurcations, each waveguide being positioned to define a row of input optical ports with each bifurcation of each waveguide having a light port at one end of the bifurcated waveguide optically aligned with and defining one input optical port of the plurality of input optical ports, and the bifurcations of each waveguide converging to define a single output optical port at a second end of the bifurcated waveguide optically aligned with and defining one of the plurality of output optical ports in the optical module; and a plurality of vertical cavity surface emitting lasers mounted on the first side of the optical module, one each mounted in optical communication with one of the input optical ports, the bifurcated waveguides coalescing outputs of the plurality of vertical cavity surface emitting lasers into a plurality of high power outputs.

6. An optical module as claimed in claim 5 wherein the optical module is made of a polymer material.

7. An optical module as claimed in claim 6 wherein the polymer material making the first waveguide and the second waveguide is photosensitive.

8. An optical module as claimed in claim 5 including in addition a common bifurcated waveguide disposed in the optical module and having a plurality of bifurcations, each bifurcation having a light port at one end of the bifurcated waveguide optically aligned with one output optical port of the plurality of bifurcated waveguides, and the bifurcations converging to define a single output optical port at a second end of the bifurcated waveguide optically aligned with and defining a common output optical port in a second side of the optical module.

9. An optoelectronic mount comprising:

an optical module including a first side having a plurality of rows of input optical ports, a second side having a plurality of output optical ports, a third side, and a plurality of bifurcated waveguides disposed in the optical module and having a plurality of bifurcations, each waveguide being positioned to define a row of input optical ports with each bifurcation of each waveguide having a light port at one end of the bifurcated waveguide optically aligned with and defining one input optical port of the plurality of input optical ports, and the bifurcations of each waveguide converging to define a single output optical port at a second end of the bifurcated waveguide optically aligned with and defining one of a plurality of output optical ports in the second side of the optical module; and a flexible circuit tape having a plurality of rows of input windows, a plurality of output windows, a first plurality of electrical tracings, and a second plurality of electrical tracings, the rows of input windows and the output windows of the flexible circuit tape being disposed over the plurality of rows of input optical ports and the plurality of output optical ports of the optical module, respectively, substantially aligning the plurality of rows of input optical ports and the plurality of output optical ports and the rows of input windows and the plurality of output windows; and an array of vertical cavity surface emitting lasers each having a light output area and a first plurality of electrical contacts, and a second plurality of electrical contacts, the array being arranged into a first plurality of vertical cavity surface emitting lasers and a second plurality of vertical cavity surface emitting lasers, the array of vertical cavity surface emitting lasers being disposed on the flexible circuit tape with the first plurality of electrical contacts being electrically coupled to the first plurality of electrical tracings and with the second plurality of electrical contacts being electrically coupled to the second plurality of electrical tracings and the light output area of each vertical cavity surface emitting laser optically aligned with an input optical port of the plurality of rows of input optical ports.

10. An optoelectronic mount as claimed in claim 9 wherein the optical module is made of a polymer material.

11. An optoelectronic mount as claimed in claim 10 wherein the polymer material is photosensitive.

12. A method for combining optical power of an array of VCSELs comprising the steps of:

forming an optical module having a first side, with a plurality of input optical ports therein, and a second side with an output optical port therein;

forming a bifurcated waveguide so as to be disposed in the optical module and having a plurality of bifurcations, each bifurcation having a light port at one end of the bifurcated waveguide optically aligned with and defining one input optical port of the plurality of input optical ports, and the bifurcations converging to define a single output optical port at a second end of the bifurcated waveguide optically aligned with and defining the output optical port in the second side of the optical module;

providing a flexible circuit tape having a plurality of input windows, a plurality of output windows, a first plurality of electrical tracings, and a second plurality of electrical tracings;

disposing the input windows and the output windows of the flexible circuit tape over the plurality of input optical ports and the plurality of output optical ports of the optical module, respectively, substantially aligning the plurality of input optical ports and the plurality of output optical ports and the input windows and the plurality of output windows;

positioning a plurality of vertical cavity surface emitting lasers on the flexible circuit tape, one each positioned in optical communication with one of the plurality of input windows, the bifurcated waveguide coalescing outputs of the plurality of vertical cavity surface emitting lasers into a single high power output; and electrically connecting each vertical cavity surface emitting laser of the plurality of vertical cavity surface emitting lasers to the first plurality of electrical tracings on the flexible circuit tape.

13. A method for combining optical power of an array of VCSELs as claimed in claim 12 where, in the step of forming the optical module, the optical module is made by a laminating process.

14. A method for combining optical power of an array of VCSELs as claimed in claim 12 where, in the step of forming the bifurcated waveguide, the bifurcations are formed by a photolithographic process.

15. A method for combining optical power of an array of VCSELs as claimed in claim 12 where, in the step of forming the optical module, the optical module is formed by including a curing process.

\* \* \* \* \*